Oct. 27, 1970            G. A. OSTER            3,536,908
FIBER OPTIC LIGHTING SYSTEM
Filed April 8, 1968
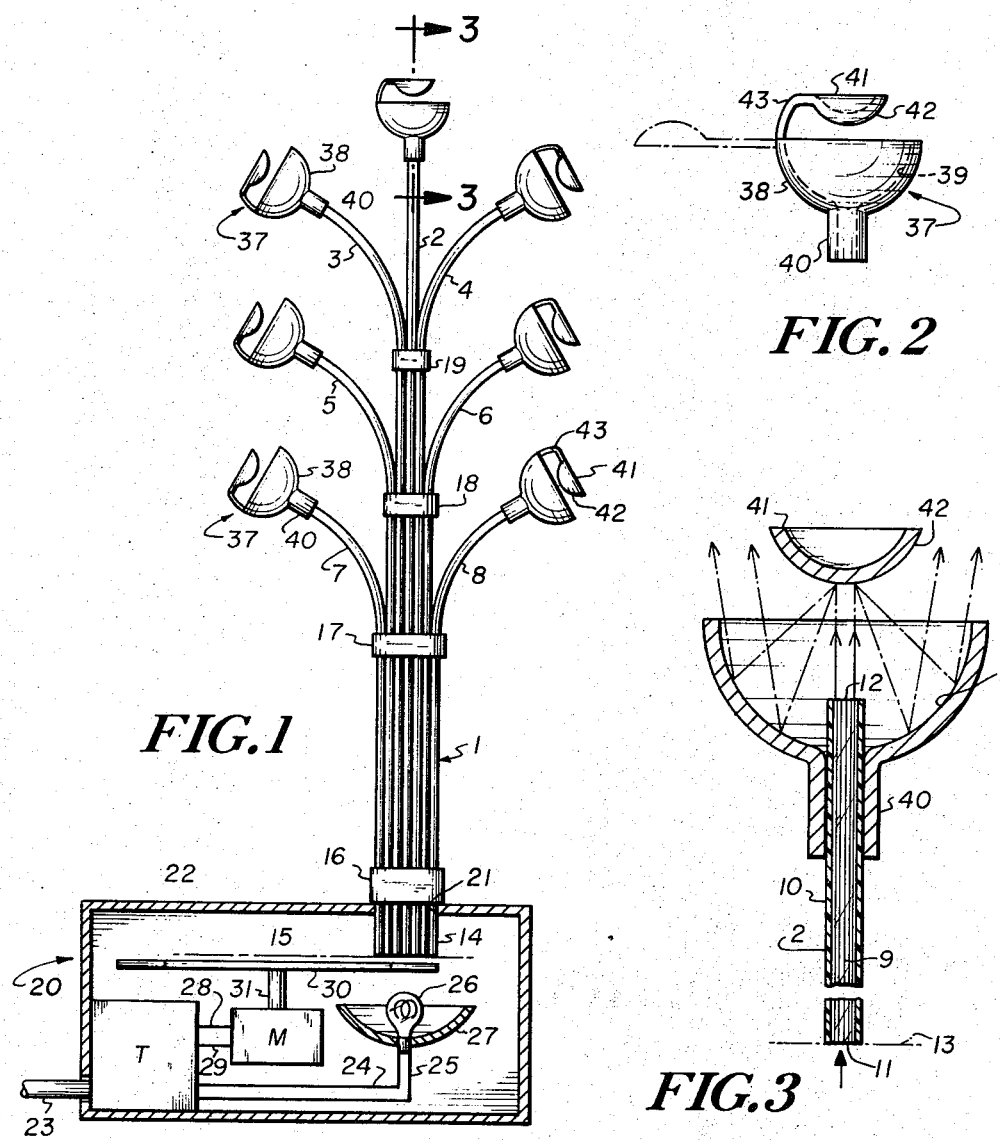
INVENTOR.
GEORGE A. OSTER
BY
AGENT

United States Patent Office 3,536,908
Patented Oct. 27, 1970

3,536,908
FIBER OPTIC LIGHTING SYSTEM
George A. Oster, Bellerose, N.Y., assignor, by mesne assignments, to National Statham, Inc., Los Angeles, Calif., a corporation of California
Filed Apr. 8, 1968, Ser. No. 719,330
Int. Cl. F21p 1/02
U.S. Cl. 240—10.1                                           3 Claims

ABSTRACT OF THE DISCLOSURE

A lighting system comprising a trunk of fiber optic bundles of different lengths, the bundles being branchable outwardly of the trunk to form a ramified trunk. A source of light is provided adjacent the base of the trunk and reflectors are mounted on the end portions of the branched bundles. The lighting system is especially suitable as an ornamental lighting system for trees or for illuminated ramiform-type representations.

BACKGROUND OF THE INVENTION

Lighting systems employing fiber optic bundles have found use in various fields where it is desirable to have the light from a light source follow a curved or bent path through a light transmitting medium from the light source to the point of emission. Such systems have one advantage in that heat producing light emitting lamps at the locale of light emission can be eliminated and by use of the fiber optic system a desirable cold light emission means is provided. Recently, such systems have been used in diagnostic instruments in the medical and surgical fields.

Usually, such fiber optical systems employ a single fiber optic bundle.

It is herein contemplated to provide a plurality of fiber optic bundles in the form of a ramified trunk of bundles for dividing light from a common source to provide for a plurality of selectively spaced light emitting means.

SUMMARY OF THE INVENTION

The present invention deals with a fiber optic lighting system comprising a plurality of fiber optic bundles each composed of a plurality of elongated light-transmitting fibers, each bundle being covered with an opaque coating, the bundles being combined to form an elongated trunk of bundles with the fibers of each bundle being exposable only at their ends for light reception at one end and light emission at the other end, the bundles terminating at a base at one end of the trunk substantially in a plane passing transversely of the trunk, a selected number of the bundles of the trunk having different lengths than another selected number of the bundles along the length of the trunk toward the other trunk end, portions of the lengths of the selected numbers of bundles being branchable outwardly of the trunk, a source of light being located adjacent the trunk base, and reflector means mounted on the end portions of the selected numbers of bundles remote from the trunk base.

DESCRIPTION OF THE DRAWINGS

FIG. 1 illustrates an elevational side view partly schematic and partly in cross-section of the system according to the invention, FIG. 2 illustrates an elevational side view of a component of the invention, FIG. 3 illustrates a cross-sectional view along lines 3—3 of FIG. 1, FIG. 4 illustrates an enlarged end view of the fiber optic bundle illustrated by FIG. 3, FIG. 5 illustrates a plan view of one type of segmented turntable as a component of the invention, and FIG. 6 illustrates a plan view of another type of segmented turntable.

DESCRIPTION OF THE PREFERRED EMBODIMENTS

Referring to the drawings, the fiber optic lighting system of the invention comprises an elongated trunk 1 composed of a plurality of preferably flexible fiber optic bundles, for example, bundles 2, 3, 4, 5, 6, 7 and 8, each composed of a plurality of elongated light-transmitting fibers 9, e.g., glass fibers, and each being coated with an opaque coating 10, preferably a resin coating. The fibers of each bundle are exposable only at their end portions, for example, at opposite extreme end portions 11 and 12, as illustrated by FIGS. 3 and 4, for light reception at one end 11 and light emission at the opposite end 12. Advantageously, the fibers of each bundle terminate in a common plane 13 passing transversely of the bundle axis at one end of the bundle and similarly at the opposite end of the bundle. The plurality of bundles composing the trunk 1 terminate substantially coextensively at one end in a trunk base 14 and advantageously in a common plane 15 passing transversely of the trunk axis. A selected number 7 and 8 of the bundles are of shorter lengths than another selected number 5 and 6 of the bundles along the length of the trunk toward the other end thereof, with portions of the lengths of the selected numbers of bundles being branchable outwardly of the trunk as illustrated by FIG. 1.

The plurality of the bundles may be secured to each other longitudinally of the trunk 1 by retaining bands 16, 17, 18 and 19.

A housing 20 is provided with an aperture 21 through a wall 22, and the base 14 of trunk 1 is fixedly mounted through the aperture. The housing contains a suitable transformer T energized by a lead-in conductor 23. Electrical feed lines 24 and 25 lead from the transformer T to a lamp 26 positioned in light-transmitting relationship with the end of the base 14. Preferably, the lamp 26 is provided with a reflector 27 to concentrate the lamp light emission toward the light receptive end of the trunk base 14.

Additionally, the housing contains a motor M energized by transformer T through motor input leads 28 and 29. A turntable 30 is mounted on a motor shaft 31 with the turntable being rotatable with radial portions thereof located between the light receptive end of the trunk base 14 and the light source or lamp 26 and in a rotating direction parallel to plane 15.

FIG. 5 illustrates a plan view of the segmented turntable 30 showing the turntable divided into light-transmitting radial segments 32, 33, 34 and 35, preferably each of a color different from the other so that the light receptive end of trunk base 14 will receive light of different colors as the turntable rotates between the light source and the trunk base.

FIG. 6 illustrates a turntable 36 of modified form from that of turntable 30 in that the segments of turntable 30 are substituted with segments which are in themselves divided into arc-like bands each of a different color, whereby light of different colors is caused to be transmitted along a selected number of fiber optic bundles in comparison with light being transmitted along another selected number of bundles.

In a fiber optic system as described above, the light emerging from the ends of each of the plurality of bundles appears as a small glow, e.g. a small circular glow, providing a narrow short beam of light in itself insufficient to adequately provide the desired ornamental light effect. With an ordinary concave parabolic reflector positioned rearwardly of the emitting end of the bundle, the narrow beam of light cannot simulate the light emitted from an ordinary but herein undesired electric light bulb because there is no adequate reflector angle of incidence provided to radiate the light as a reflectorized light of divergence. Therefore, in accordance with the invention, the free ends of the bundles remote from the trunk base are provided with a dual reflector assembly such as illustrated by the dual reflector assembly 37 shown in FIGS. 1 and 2. The reflector assembly comprises the combination of a reflector 38 having a concave light-reflecting surface 39 and a means 40, e.g. a sleeve, for mounting the reflector 38 onto an end portion of a fiber optic bundle 2 with the light means or end portion 12 positioned substantially adjacent the reflecting surface axially of the reflector 38, i.e. the reflector being mounted on the bundle 2 rearwardly of its light emitting end. A second reflector 41 of convex shape is mounted forwardly of the light emitting end 12 of bundle 2 and having its convex surface 42 as the reflecting surface. The second reflector can be mounted by means of an arm 43 connecting it to the rim of the concave reflector or in any other suitable manner so long as the convex reflecting surface receives a beam of light from the end of bundle 2 and divergently reflects the light onto the reflective surface 39 of reflector 38.

Various modifications of the invention are contemplated within the scope of the appended claims.

What is claimed is:

1. A lighting system comprising a plurality of fiber optic bundles each composed of a plurality of elongated light-transmitting fibers, each bundle being coated with an opaque coating, the fibers of each bundle being exposable only at their end portions for light reception at one end and light emission at the other end, the plurality of bundles being combined to form an elongated trunk of bundles, the plurality of bundles forming the trunk terminating substantially co-extensively at one end of the trunk, a selected number of the bundles having different lengths than another selected number of the bundles, portions of the lengths of the selected numbers of bundles being branchable outwardly of the trunk, a source of light positioned to direct light toward the said one end of the trunk, and reflector means mounted on the end portions of the selected numbers of bundles remote from the said one end of the trunk, wherein the reflector means comprises a plural reflector assembly, one of the reflectors of the assembly being mounted on one end of each of the selected number of bundles rearwardly of its light-emitting end and having a parabolic concave light-reflecting surface encompassing the light-emitting end, the other reflector of the assembly being suitably mounted forwardly of the light-emititng end and having a convex curved reflecting surface facing the said light-emitting end.

2. A lighting system according to claim 1, wherein the fibers of each bundle terminate at one end in a common plane passing transversely of the bundle and the fibers at the end terminate in a common plane passing transversely of the bundle.

3. A lighting system according to claim 1, wherein said other reflector includes an arm which is integral with the connective reflector.

References Cited
UNITED STATES PATENTS

| | | | |
|---|---|---|---|
| 1,469,690 | 10/1923 | Smith | 240—41.1 |
| 2,227,861 | 1/1941 | Petrone | 240—10.1 |
| 2,825,260 | 3/1958 | O'Brien. | |
| 3,431,410 | 3/1969 | Dolan et al. | 240—10.1 |

NORTON ANSHER, Primary Examiner

K. C. HUTCHISON, Assistant Examiner

U.S. Cl. X.R.

240—1, 10.1, 41.1